July 21, 1936.   R. BOECKER   2,048,055
DISK CARRYING FRAME FOR TRACTOR PULLED CULTIVATORS
Filed Aug. 9, 1935   4 Sheets-Sheet 1
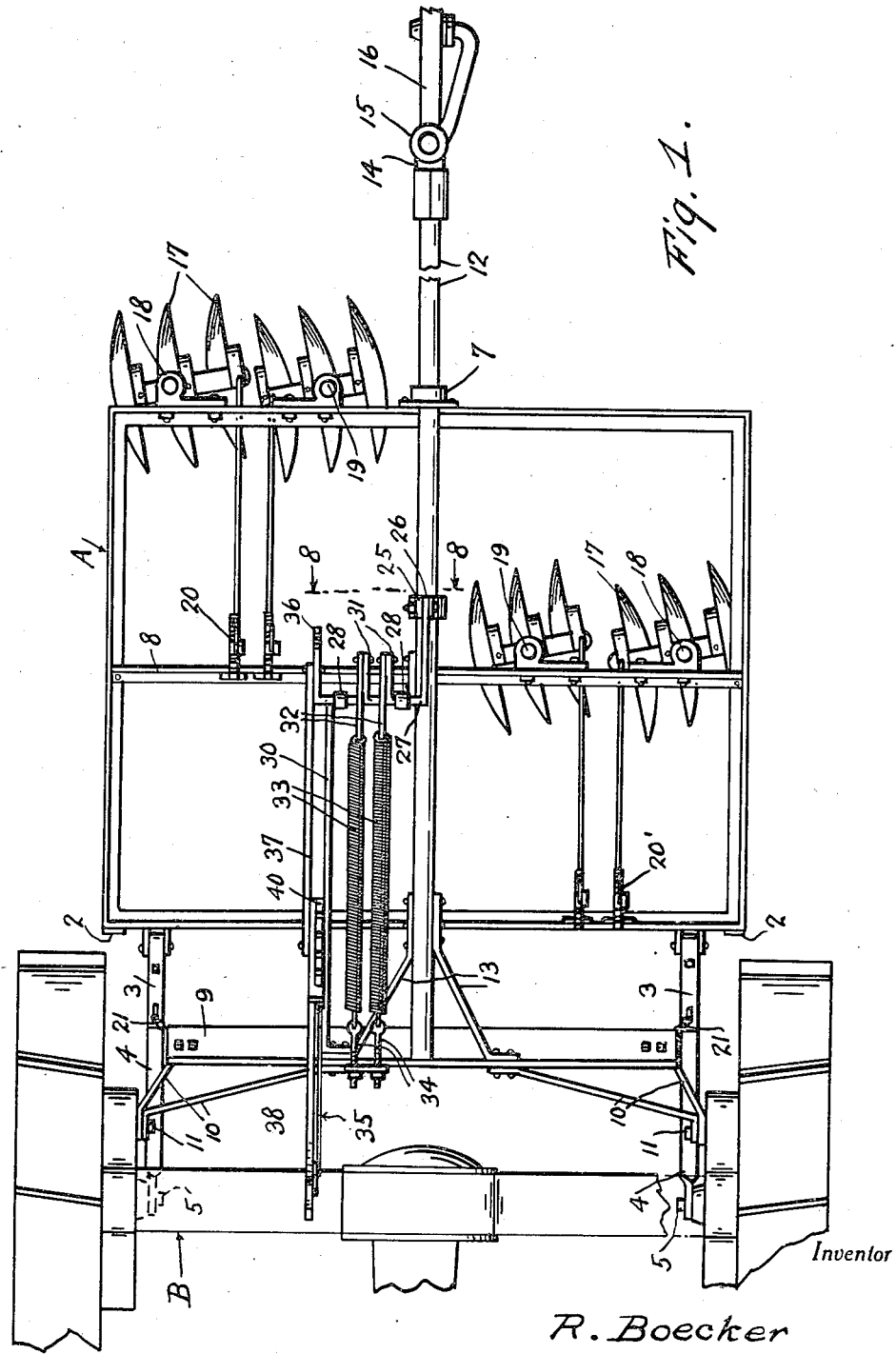
Inventor
R. Boecker
By Clarence A. O'Brien
Attorney

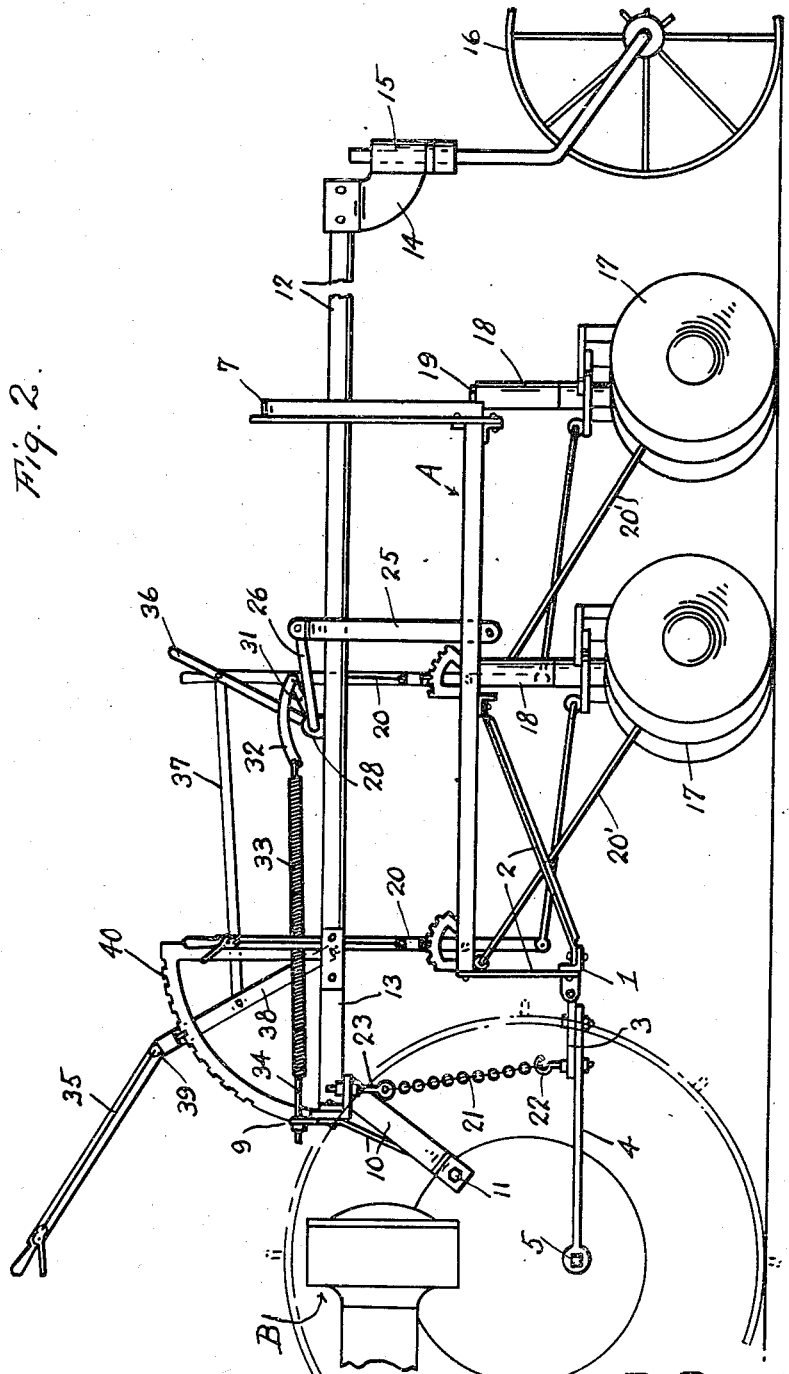

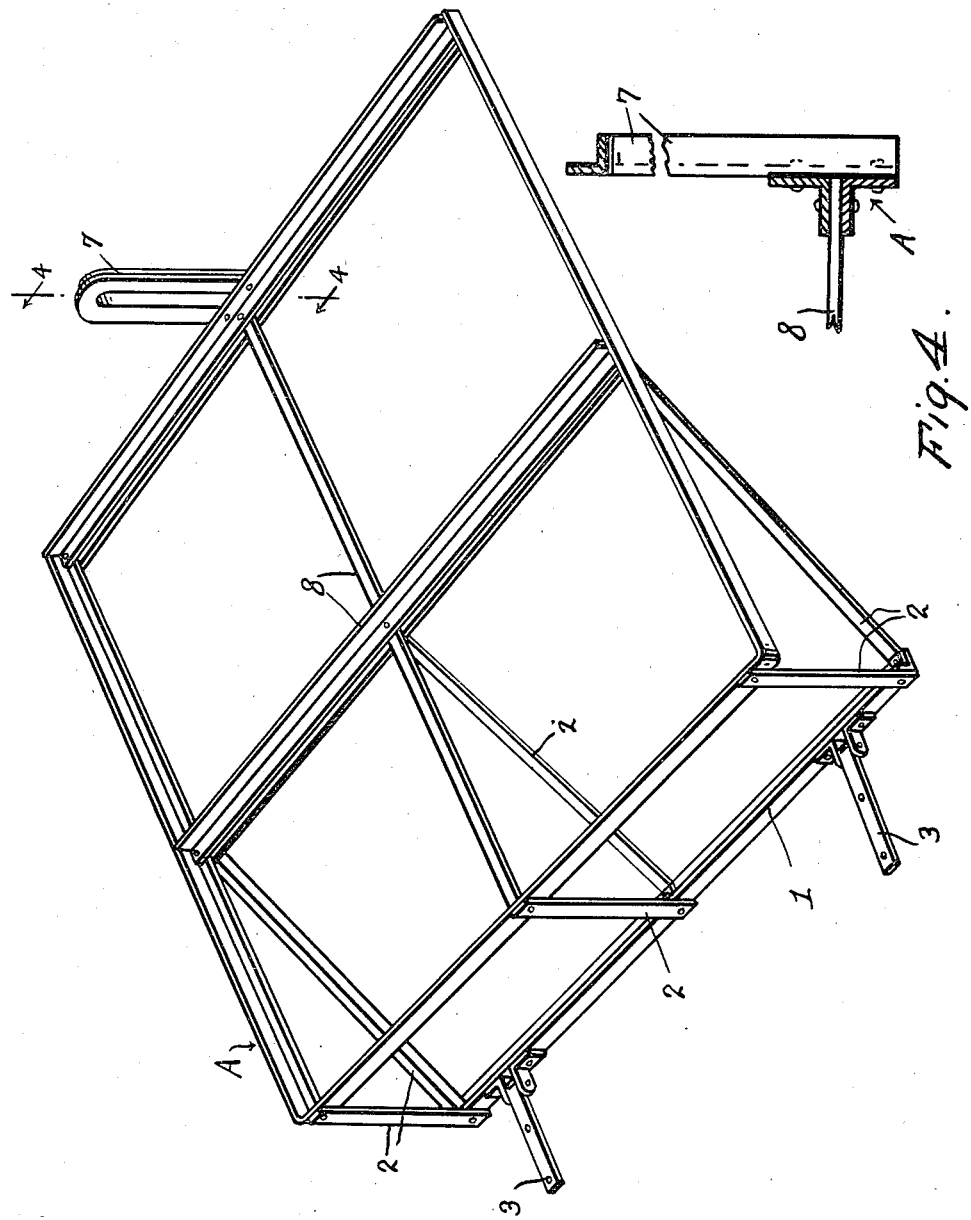

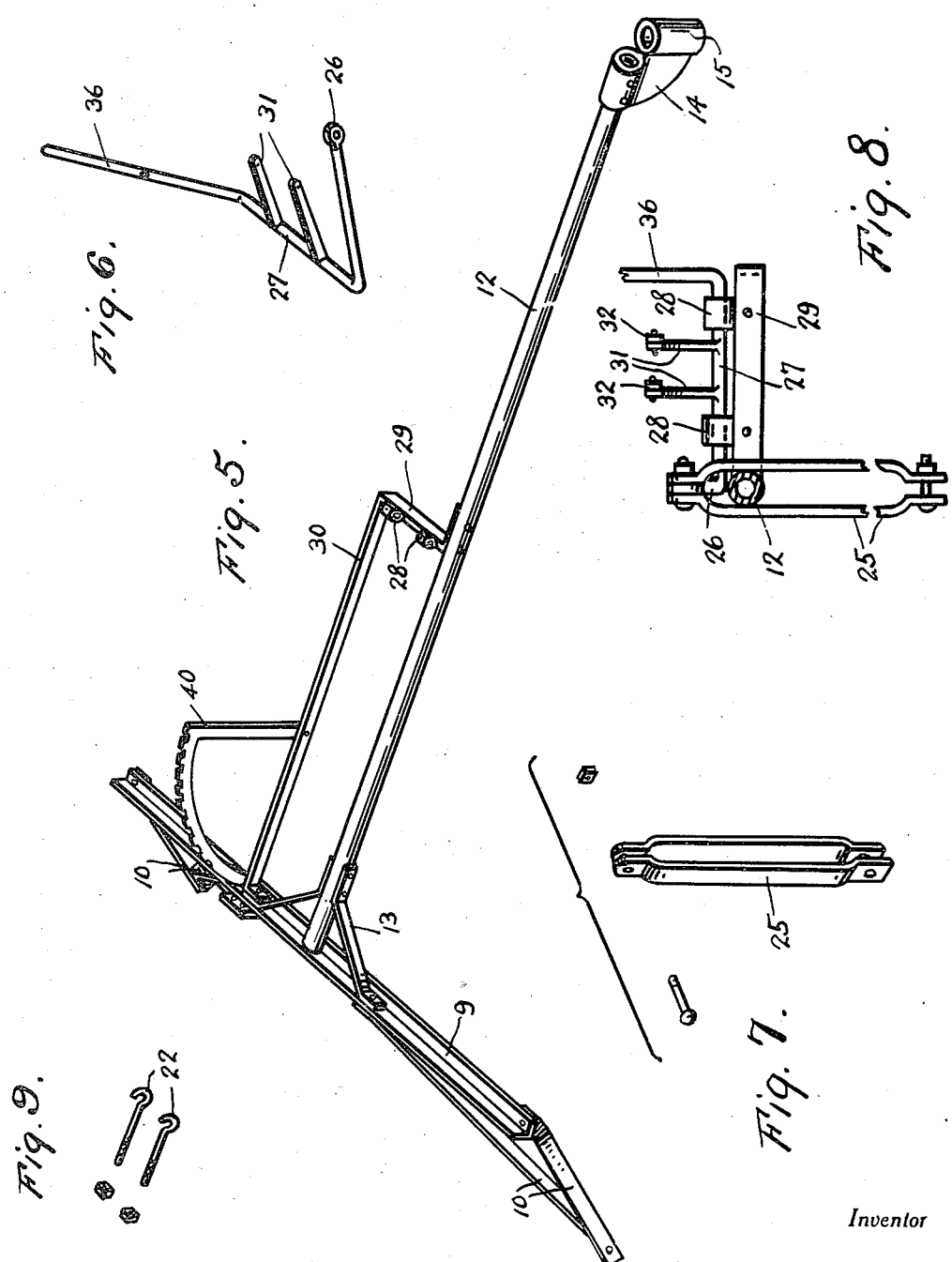

Patented July 21, 1936

2,048,055

UNITED STATES PATENT OFFICE 2,048,055

DISK CARRYING FRAME FOR TRACTOR PULLED CULTIVATORS

Robert Boecker, Needville, Tex.

Application August 9, 1935, Serial No. 35,547

2 Claims. (Cl. 97—47)

This invention relates to a frame for supporting the disks of cultivators and the like, the general object of the invention being to provide a supporting frame with hinge means for connecting the same to a tractor and means for raising and lowering the frame so that the disks can be moved into and out of operating position.

This invention also consists in certain other features of construction and in the combination and arrangement of several parts, to be hereinafter fully described, illustrated in the accompanying drawings and specifically pointed out in the appended claims.

In describing the invention in detail, reference will be had to the accompanying drawings wherein like characters denote like or corresponding parts throughout the several parts, and in which:—

Figure 1 is a top plan view of the invention showing the same attached to a tractor.

Figure 2 is a side view of Figure 1.

Figure 3 is a perspective view of the frame.

Figure 4 is a section on the line 4—4 of Figure 3.

Figure 5 is a view of the wheel carrying bar and the frame attached to the front end thereof.

Figure 6 is a view of the lever member to which the springs are attached and which acts to raise and lower the disk carrying frame.

Figure 7 is a view of the loop member with the bolt and nut in exploded view.

Figure 8 is a section on the line 8—8 of Figure 1.

Figure 9 is a view of a pair of eye-bolts used for connecting chains to a part of the device.

In these drawings the letter A indicates a substantially rectangular frame which includes a lower front bar 1 connected with the frame A by the braces 2 and which is provided with the hinged straps 3 which are bolted to the bars 4 having their front ends attached to parts of a tractor B as shown at 5. The frame A is formed with a vertically arranged upstanding U-shaped member 7 at the central part of its rear end and with the right angularly arranged cross members 8.

A bar 9 is connected by the braces 10 with parts of the tractor as shown at 11 and a tubular member 12 has its front end connected with the central part of the bar 9, braces 13 also connecting the tubular member with the bar. This tubular member passes through the member 7 and has the curved downwardly extending part 14 on its rear end which carries the bearing 15 for the caster wheel 16. The usual gangs of disks 17 are carried by the frame A through means of the vertical bearings 18 carried by the frame and receiving the upright shafts 19 of the gangs. The gangs are rocked in their bearings through means of the hand levers and links shown generally at 20. Chains 21 have their lower ends connected to hooks 22 adjustably supported by the members 4 and their upper ends engage eye bolts 23 adjustably arranged in the arm 9. By adjusting the chains the frame A can be adjusted so that the disks will cut to the same depth.

A two part loop member 25, shown in detail in Figures 7 and 8, has the tubular member 12 passing therethrough with the lower end of the member 25 connected to a part of the frame A and its upper end being pivoted to the crank arm 26 of a rock shaft 27 journaled as at 28 in the lateral part 29 of a brace 30 which has one end attached to the bar 9 and its other end to the tubular member 12 as shown more clearly in Figure 5. A pair of arms 31 is carried by the shaft 27 to which the curved links 32 are connected, springs 33 connecting these links with eye bolts 34 adjustably arranged in a bracket 35 extending upwardly from the bar 9. A long arm 36 is connected with the shaft 27 and a link 37 connects an intermediate part of the arm 36 with a hand lever 38 pivoted to the bar 9 and having its latch part 39 operating over a sector 40.

Thus by operating the hand lever 38 the link 37 through means of the arm 36 will rock the shaft 27 so as to cause the member 25 to raise the frame A and thus raise the disks above the ground so that the implement can be turned and travel over roads without the disks contacting the road surface. The springs 33 facilitate raising the disk. By moving the hand lever 38 in an opposite direction the frame A will be lowered to place the disks in engagement with the ground and by operating the levers 20 the disks can be reversed or placed at different angles.

It is thought from the foregoing description that the advantages and novel features of the invention will be readily apparent.

It is to be understood that changes may be made in the construction and in the combination and arrangement of the several parts, provided that such changes fall within the scope of the appended claims.

What is claimed is:—

1. A farm implement of the class described comprising a frame, means for hingedly connecting one end of the frame to a tractor, ground engaging elements carried by the frame, a second frame connected with the tractor and including an elongated member, a caster wheel connected with the rear end of said member, means carried by the second frame and manually operated for raising and lowering the first frame, and an adjustable chain for connecting the hinge means of the first frame with the second frame.

2. A farm implement of the class described comprising a cross-piece connected with the rear part of a tractor, a rearwardly extending elongated member having its front end connected with the central portion of said cross piece, a caster wheel carried by the rear end of said elongated member, an implement carrying frame including a cross bar located below the front end of the last mentioned frame, hinges carried by said cross-bar, bars connected with the rear portion of the tractor and to which the hinges are connected, chains connecting the hinges to the first mentioned cross bar, means for adjusting the chains, means carried by the first mentioned cross piece and the elongated member, for raising and lowering the implement carrying frame, and ground engaging implements carried by said frame.

ROBERT BOECKER.